Jan. 8, 1963 R. A. MALONEY 3,072,732
ELECTRODE HOLDER WITH CURRENT INTERCHANGE INSERTS
Filed Oct. 27, 1958
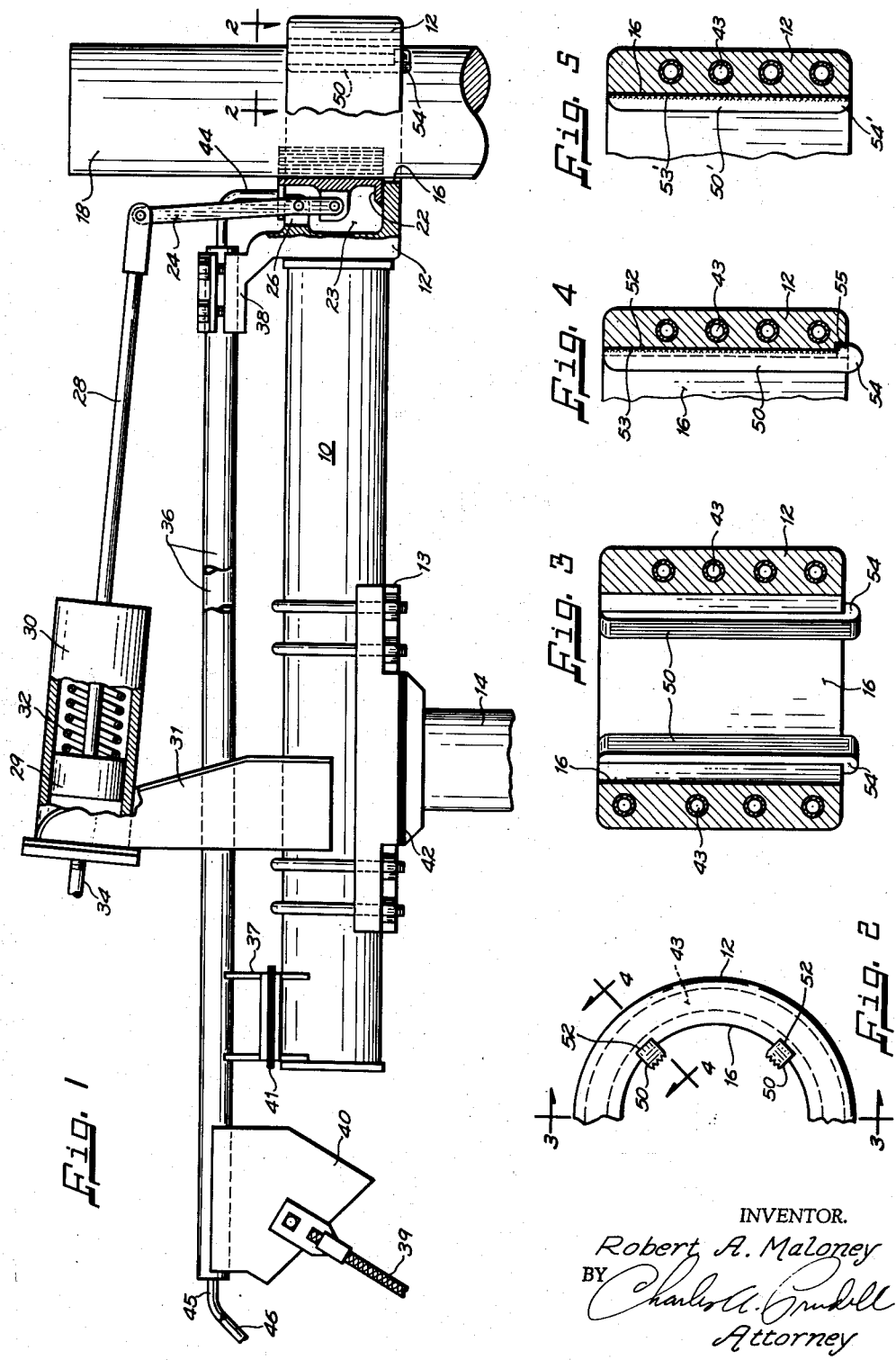
INVENTOR.
Robert A. Maloney
BY
Charles A. Grindell
Attorney United States Patent Office 3,072,732
Patented Jan. 8, 1963

3,072,732
ELECTRODE HOLDER WITH CURRENT INTERCHANGE INSERTS
Robert A. Maloney, Pitcairn, Pa., assignor to McGraw-Edison Company, Milwaukee, Wis., a corporation of Delaware
Filed Oct. 27, 1958, Ser. No. 769,770
2 Claims. (Cl. 13—16)

This invention relates to electric arc furnaces and more particularly, to electrode clamping and positioning means.

Electric arc furnaces are generally provided with an electrode holder mounted on the end of an electrode positioning arm for holding and positioning the electrode relative to the furnace charge as well as for electrically connecting the electrode to a source of electrical energy. The electrode clamp generally comprises a cylindrical sleeve like member having a bore for slidably receiving the electrode and a pressure shoe which forces the electrode against the walls of the bore whereby the electrode is frictionally held. The transfer of current to the electrode is from the walls of the electrode holder bore, which is suitably connected to a source of electrical energy.

During operation, the surface of such electrode holder bores commonly becomes pitted or eroded due to arcing which results from inadequate contact surface between the electrode and the electrode holder, inadequate pressure at the point of contact, and overly high resistance resulting from oxide formations on the surface of the electrode holder. Such pitting adversely affects furnace operation and requires periodic replacement or costly repair of the electrode holder.

Attempts to relieve this situation by the use of replaceable arcuate shaped plate members mounted between the contact sleeve and the electrode are not entirely satisfactory because pitting of the electrode holder still occurred as a result of arcing between the outer surface of the plate and the clamping sleeve. This arcing results in part from increased resistance at current interchange points due to the formation of oxides and the lodging of foreign particles between the plate and the electrode holder. Such pitting can only be prevented by cleaning of the electrode holder and replacement of the insert plate at regular intervals necessitating costly shutdowns in furnace operation. These arcuate insert members were further inadequate because in some instances, only a single line of contact could be achieved between their curved surface and the cylindrical surface of the electrode and also because it was difficult to maintain adequate contact pressure between these surfaces, which further increased the tendency to arc.

It is an object of the invention to provide arc furnace electrode holders which do not require periodic cleaning to prevent pitting.

It is another object of the invention to provide insert members for an arc furnace electrode holder wherein oxides and other foreign matter cannot collect between the electrode holder body and the insert member.

It is a further object of the invention to provide inserts for arc furnace electrode holders which provide adequate contact surface with the electrode and insure adequate contact pressure.

It is a still further object of the invention to provide a junction between such insert members and the electrode holders which is gas impervious so that the collection of foreign material and the formation of oxides and the collection of foreign matter at current interchange points is prevented.

It is yet another object of the invention to provide inserts for arc furnace electrode holders which are resistant to pitting and abrasion.

Other objects and advantages of the invention will become apparent from the detailed description of the invention taken in view of the following drawings in which:

FIG. 1 shows an electrode holding arm having an electrode holder embodying the present invention;

FIG. 2 shows a fragmentary top view of an electrode holder embodying inserts according to the present invention;

FIG. 3 is a sectional view taken along lines 3—3 of FIG. 2;

FIG. 4 is a fragmentary sectional view taken along lines 4—4 of FIG. 2; and

FIG. 5 shows a fragmentary sectional view similar to FIG. 4 of an electrode holder provided with an alternate embodiment of the invention.

Referring now to the drawings in greater detail, FIG. 1 shows electrode holding arm 10 having an electrode holder 12 affixed to one end thereof. The electrode holding arm 10 is secured to cradle member 13 carried on the upper end of a column member 14 of an electrode ram (not shown but which is well known in the art) for supporting the electrode holding arm and for raising and lowering it in response to furnace conditions.

The electrode clamp 12 is composed of an electrically conductive material and has a substantially cylindrical bore 16 for slidably receiving an electrode 18. A clamp shoe 22 for frictionally holding electrode 18 is slidably disposed in a cavity 23 formed in the surface of bore 16 adjacent electrode holding arm 10. Force is applied to clamp shoe 22 by means of an operating lever 24 pivotally connected at its lower end to clamp shoe 22 and fixedly pivoted adjacent said lower end on pivot yoke 26 carried near the upper end of cavity 23 so that counter clockwise rotation of said lever arm will move clamp shoe 22 toward electrode 18. Operating lever 24 is actuated by means of push-pull rod 28 coupled to piston 29 of an air or hydraulic cylinder 30, suitably supported above holding arm 10 by a bracket 31. Piston 29 is normally biased to the left, as viewed in FIG. 1, by spring 32, thereby pivoting operating lever 24 in a counter clockwise direction around pivot yoke 26 so that clamp shoe 22 is forced into gripping relation with electrode 18. Electrode 18 may be released by supplying fluid under pressure to cylinder 30 through inlet pipe 34 to overcome the force of spring 32 and force piston 29 to the right.

Electrical energy is supplied to electrode holder 12 through the agency of a hollow pair of parallel bus tubes 36 supported above holding arm 10 at its end remote from the electrode 18 by a bracket 37 and at the electrode end by conductive bracket 38 integral with electrode holder 12 and extending above the upper edge thereof. Bus tubes 36 are coupled to a source of electrical energy by means of a cable 39 connected to a conductive bracket member 40 mounted on the end of said tubes remote from the electrode 18. Suitable electrical insulation 41 and 42 is provided between bracket 37 and holding arm 10 and between said holding arm and column member 14 respectively, to prevent objectionable circulating currents.

Electrode holder 12 is provided with cooling fluid cores 43 which are supplied with cooling fluid through hollow bus tubes 36 which are coupled at one end to said cores by coupling tubes 44 and at their other end to a source of said fluid by inlet and outlet pipes 45 and 46, respectively.

The improvement which comprises the instant invention consists of providing the electrode holder above described with a plurality of elongated spaced apart current transfer member affixed to the surface of the electrode holder bore 16 at points opposite pressure shoe 22 and disposed substantially parallel to the axis of the electrode. The invention further includes the provision of a gas impervious seal between the electrode holder and the insert to prevent the penetration of gases and waste material therebetween.

In the preferred embodiment of the invention the electrode holder 12 is provided with at least two insert members 50 which are affixed in spaced apart grooves 52 formed in the surface of bore 16 opposite pressure shoe 22. Each insert member 50 is secured in its respective groove 52 by any suitable means 53 such as silver brazing, soldering, welding or the like depending on the nature of the materials, which means will form a junction between the members that is impervious to gases and other foreign material. In this manner, a continuous seal is provided around the junction between the electrode holder 12 and insert 50 thereby eliminating furnace gases and other foreign material having a tendency to oxidize the adjacent surfaces of these members and as a result increasing contact resistance and causing arcing. In addition, securing the surfaces in this manner places a conductive material in intimate relation with the surfaces of the electrode holder 12 and the insert 50 thereby greatly reducing the resistance at this junction and the tendency for arcing to occur between portions of these members which would normally be spaced apart as a result of nonuniformity in the surfaces due to normal manufacturing tolerances.

The insert members 50 shown in FIGS. 1–4 may be provided with a small hook like portion 54 at its lower end which fits into a mating notch 55 formed in the lower end of groove 52. This will tend to deflect gases and other particles escaping from the furnace along the electrode away from the junction between the insert 50 and the electrode holder 12.

In the alternate embodiment of the insert member 50', shown in FIG. 5, the hook like portion is eliminated and the lower end has an arcuate portion 54', which is substantially tangent with the lower edge of the electrode holder 12. This embodiment also illustrates that the insert member 50' may be secured directly to surface of bore 16 without utilizing grooves 52.

The inserts are preferably formed of an extremely hard, nonmagnetic copper tungsten alloy having approximately 45% copper and 55% tungsten. This material is highly conductive and yet resistant to burning, pitting, and abrasion, and the impregnation of foreign material into its surface, which would have a tendency to increase contact resistance and enhance arcing conditions. The inner surfaces of said insert members are preferably serrated to facilitate gripping of the electrode.

The electrical circuit between the cable 39 and the electrode 18 is completed through conductive bracket member 40, bus tube 36, conductive bracket portion 38, electrode holder 12, and insert members 50.

By the use of a plurality of such insert members electrical contact between the electrode and the electrode holder 12 is established between at least two substantially fixed points thereby eliminating arcing due to an inadequate contact surface or shifting points of contact between the electrode and the electrode holder. Also, by forcing the electrode against these fixed points, greater contact pressure can be achieved than would be possible between two substantially cylindrical surfaces as utilized in the prior art. Further, by supporting the electrode in spaced apart relation to the surface of the electrode holder 12, ash and the other foreign particles from the furnace are allowed to pass through the electrode holder bore and thereby they will not collect and cause pitting. Because the bore is thereby unrestricted the velocity of the material passing therethrough has a tendency to have a self-cleaning action on the bore itself.

While for purposes of illustration, the invention has been shown in relation to a device wherein the clamp shoe 22 moves outward from holding arm 10, it will be understood by those skilled in the art that the invention is equally applicable to other types of electrode clamps as well. For this reason it is not intended that the appended claims be limited to any particular type of electrode holder, but to cover use of the disclosed insert members in all types of arc furnace electrode holders wherein current is transferred between the electrode holder and the electrode.

I claim:

1. An arc furnace electrode holder having a bore for slidably receiving an arc furnace electrode, a plurality of elongate grooves formed in said bore substantially parallel to its axis and in spaced apart relation to each other, an elongate conductive insert member disposed in each of said grooves, each of said conductive members having substantially the same width as its associated groove and a height which exceeds the depth thereof, a pressure clamp disposed within said bore and spaced from each of said conductive members, said clamp being constructed and arranged to force said electrode against said conductive members so that said electrode is held within said bore and good electrical contact is achieved between said conductive members and said electrode, a conductive metallic bond distinct from said member and said holder affixing said conductive members within their respective grooves to provide good electrical contact therewith and to provide a fluid impervious seal around the periphery of the junction between said conductive member and said bore so that gas and other foreign material from said furnace cannot penetrate therebetween.

2. The device set forth in claim 1 wherein the insert members are composed of a copper tungsten alloy.

References Cited in the file of this patent

UNITED STATES PATENTS

| | | |
|---|---|---|
| 1,335,895 | Hughes | Apr. 6, 1920 |
| 1,552,619 | Klugh | Sept. 8, 1925 |
| 1,751,780 | Weiger | Mar. 25, 1930 |
| 2,133,305 | Payne | Oct. 18, 1938 |
| 2,464,591 | Larson et al. | Mar. 15, 1949 |
| 2,494,775 | Moore | Jan. 17, 1950 |
| 2,538,603 | Thys | Jan. 16, 1951 |
| 2,795,770 | Toedtman | June 11, 1957 |
| 2,884,475 | Foyn | Apr. 28, 1959 |
| 2,897,599 | Kamatani | Aug. 4, 1959 |